March 31, 1959  W. C. HARBEN  2,880,015
FENDER COVER
Filed Sept. 26, 1958
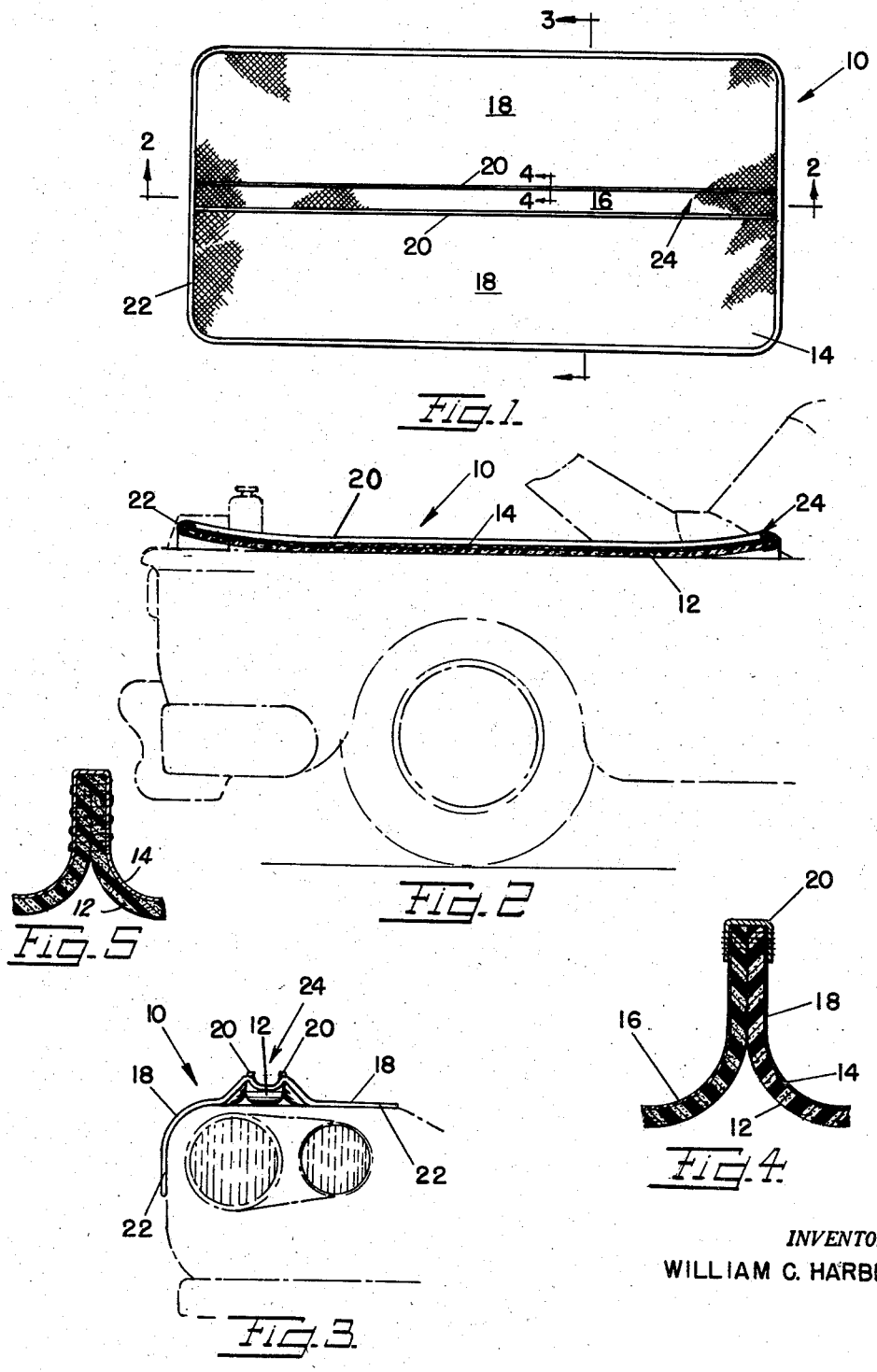
INVENTOR.
WILLIAM C. HARBEN

United States Patent Office 2,880,015
Patented Mar. 31, 1959

2,880,015

FENDER COVER

William C. Harben, Santa Monica, Calif.

Application September 26, 1958, Serial No. 763,518

6 Claims. (Cl. 280—150)

This invention relates to improvements in protective coverings for highly finished surfaces and is concerned more particularly with covers for vehicle fenders or the like to protect the same such as when mechanics are working on the engine or other aprts beneath the vehicle hood. In general, the present invention provides improvements over the fender covers shown in my earlier Patent No. 2,522,612, dated September 19, 1950.

The fender covers contemplated by the invention are of relatively thin flexible material adapted to be placed over the surface of a vehicle fender and conform to the contour thereof. The principal object of the invention is to combine with such a fender cover structure in the form of a pocket or channel member for holding tools and various small parts such as pins, springs, nuts and bolts and the like.

Another object of the invention is to provide a tool holding pocket channel member for a fender cover wherein the member is of a configuration which tends to retain the tools or other small devices placed therein and to prevent their rolling out. In its specific aspects the invention contemplates the provision of an elongated channel formed in the upper surface of the fender cover with the channel having upwardly flaring end portions.

Other objects and advantages will be apparent from the following detailed explanation taken in conjunction with the accompanying drawings wherein a preferred embodiment of the principles of the invention has been selected for exemplification.

In the drawings:

Fig. 1 is a top plan view of a combined fender cover and tool holder constructed in accordance with the present invention;

Fig. 2 is a longitudinal sectional view taken on the line 2—2 of Fig. 1 and showing the cover disposed in operative position upon the front fender of an automobile indicated in broken line fragment;

Fig. 3 is a front end view of the cover as shown in Fig. 2;

Fig. 4 is an enlarged detailed section taken on the line 4—4 of Fig. 1; and

Fig. 5 is a view similar to Fig. 4 but showing a modified form of the invention.

Referring more particularly to the drawings, wherein like numerals refer to like parts, the combined fender cover and tool holder illustrated is designated in its entirety by the numeral 10. The cover 10 is formed preferably of relatively thin flexible sheet material laminated from an under layer of sponge rubber 12 or the like for frictionally gripping or adhering to the fender or other surface upon which the cover is placed and an upper layer of rubberized drill 14 or other material substantially impervious to oil and moisture bonded to the sponge rubber layer 12. The cover 10, however, may be formed from any other suitable kind of flexible sheet material whether single ply or laminated.

The cover 10 is fabricated from the flexible sheet material in one form of the invention by cutting therefrom an elongated central strip 16 and elongated side skirt portions 18 for each side of the central strip 16. The contiguous edge portions of the central strip 16 and each side skirt 18 are then aligned, folded with their under surface portions in engagement and stitched or otherwise secured together in suitable manner, for example, by an ordinary sewing machine. The upper contiguous edges of the ridges thus formed are preferably covered by tapes 20 which may be joined thereto during the single stitching operation. A bordering tape 22 is also preferably stitched or otherwise suitably secured to the peripheral marginal edges of the assembled central strip 16 and opposed side skirts 18. The tapes 20 and 22 are preferably also composed of oil and moisture impervious material.

It will be apparent that the central strip 16 of the cover 10 when fabricated as above described forms a substantially U-shaped upright channel 24 extending transversely of the cover 10 along its upper surface when operatively positioned upon an automobile fender as indicated in Figs. 2 and 3. The channel or pocket 24 forms a readily accessible holder for various mechanic's tools and small parts or other objects which may be involved in the mechanic's work. The upstanding parallel side ridges formed by the joined contiguous edge portions of the central strip 16 and side skirts 18, besides reinforcing the cover 10, provide channel side walls to prevent the tools or other objects from sliding laterally outwardly of the channel or pocket 24.

Larger tools such as wrenches and screw drivers instead of being held in the channel 24 may be placed transversely across the upstanding ridges which form the channel member. To this end the upper ends of these ridges are preferably formed substantially flat or horizontal as shown in Figs. 3 and 4 to provide a maximum area for frictional engagement and a stable support for such larger tools.

As a further feature of the invention the opposed end portions of the channel 24 are upwardly flared as shown in Figs. 2 and 3 when the cover 10 is spread outwardly in operative position upon a vehicle fender. The upward flare may be formed when the cover 10 is stitched or otherwise fabricated or in some cases depending upon the material employed the weight of the central body portion of the cover may cause the same closely to hug the engaged surface and the reduced weight at the end portions may allow these end portions to flare upwardly. However, regardless of the manner provided, the upwardly flared channel end portion structure is important in tending to prevent tools and other objects from rolling endwise out of the channel 24 or endwise off the upstanding ridges and to induce their retention in the central body portion of the channel. The upwardly flared end portions also provide for some circulation of air beneath the cover and further function as elevated hand holds to facilitate removal of the cover from the fender surface.

Instead of fabricating the fender cover from separate pieces of material, a single sheet of material, as indicated in Fig. 5, may be employed, pleated along the same lines as the contiguous edge portions of the central strip 16 and side skirts 18, and the pleats sewn or otherwise secured together to form upstanding ridges. Use of tapes 20 over these ridges is optional. When the fender cover is fabricated in this manner the tool holding channel 24 has substantially the same general form and appearance as in the plural piece construction including the upwardly flared end portions. The plural piece construction, however, is usually preferred because the straight cut edges which form the upper ends of the channel ridges are flatter so as to provide a firmer transverse tool support and it is not necessary to mark the sheet material to delineate the pleat lines. Also, where sewing is employed, there is less tendency for the stitches to pull apart.

As will be apparent from the foregoing the present invention provides a fender cover which is highly useful particularly for automobile mechanics in that it incorporates in its structure readily accessible and efficient holding means for small as well as large tools and other objects in addition to serving the usual functions of prior fender covers.

It is also to be understood that the present invention is not confined to the particular construction and arrangements of parts as herein illustrated and described but embraces all such modifications thereof as may come within the scope of the following claims.

I claim:

1. A combined fender cover and tool holder comprising, flexible sheet material adapted to be draped over the surface of a vehicle fender and conform substantially to the contour thereof, and spaced parallel ridges formed in said sheet material and extending lengthwise of the central portion thereof to form a channel member for holding tools, said ridges being formed by upturned portions of said sheet material secured together in abutting relation.

2. A combined fender cover and tool holder comprising, flexible sheet material adapted to be draped over the surface of a vehicle fender and conform substantially to the contour thereof, and spaced parallel ridges formed in said sheet material and extending lengthwise of the central portion thereof to form a channel member for holding tools, said ridges being formed by upturned portions of said sheet material secured together in abutting relation, the opposed end portions of said channel member extending upwardly to tend to retain tools in said channel member.

3. A combined fender cover and tool holder adapted to be draped over the surface of a vehicle fender and conform substantially to the contour thereof which comprises, a central strip of flexible sheet material, side skirts of flexible sheet material at opposed sides of said central strip and the adjacent side edge portions of the said strip and side skirts being upturned and secured together in abutting relation to provide spaced parallel ridges extending lengthwise of the central portion of the cover to form a channel member for holding tools.

4. A combined fender cover and tool holder adapted to be draped over the surface of a vehicle fender and conform substantially to the contour thereof which comprises, a central strip of flexible sheet material, side skirts of flexible sheet material at opposed sides of said central strip and the adjacent side edge portions of the said strip and side skirts being upturned and secured together in abutting relation to provide spaced parallel ridges extending lengthwise of the central portion of the cover to form a channel member for holding tools, the opposed end portions of said channel member extending upwardly to tend to retain tools in said channel member.

5. A combined fender cover and tool holder comprising, a single flexible sheet of material adapted to be draped over the surface of a vehicle fender and conform substantially to the contour thereof, and spaced parallel ridges formed in said sheet and extending lengthwise of the central portion thereof to form a channel member for holding tools, said ridges being formed by folded upturned portions of said sheet secured together in abutting relation.

6. A combined fender cover and tool holder comprising, a single flexible sheet of material adapted to be draped over the surface of a vehicle fender and conform substantially to the contour thereof, and spaced parallel ridges formed in said sheet and extending lengthwise of the central portion thereof to form a channel member for holding tools, said ridges being formed by folded upturned portions of said sheet secured together in abutting relation, the opposed end portions of said channel member extending upwardly to tend to retain tools in said channel member.

References Cited in the file of this patent

UNITED STATES PATENTS

| | | |
|---|---|---|
| 228,961 | Weissenborn | June 15, 1880 |
| 1,435,312 | Kraft | Nov. 14, 1922 |
| 2,797,932 | Ambrose | July 2, 1957 |